United States Patent [19]
Hay

[11] 3,720,833
[45] March 13, 1973

[54] RADIATION BACKSCATTER MEASURING INSTRUMENT

[75] Inventor: William D. Hay, Peekskill, N.Y.

[73] Assignee: Unit Process Assemblies, Inc., Woodside, N.Y.

[22] Filed: May 10, 1971

[21] Appl. No.: 141,496

[52] U.S. Cl. ............................ 250/83.3 D, 250/106 S
[51] Int. Cl. ................................................. G01t 1/16
[58] Field of Search ........... 250/83.3 D, 106 S, 108 R

[56] References Cited

UNITED STATES PATENTS

| 3,372,281 | 3/1968 | Auld et al. | 250/106 S |
| 3,529,158 | 9/1970 | Joffe et al. | 250/106 S X |

*Primary Examiner*—James W. Lawrence
*Assistant Examiner*—D. L. Willis
*Attorney*—Robert E. Isner and Peter J. Franco

[57] ABSTRACT

A radiation backscatter measuring instrument is provided for use with a portable probe assembly having an elongated casing with an opening at one end thereof and containing a radiation source positioned in predetermined relation therewith and a radiation detector for detecting radiation backscattered from a workpiece exposed to radiation from the source through the casing opening. The radiation backscatter measuring instrument includes a planar, horizontally disposed, transparent locator with a series of guide lines on the bottom surface thereof which is positioned over the selected locus of measurement on the horizontally supported workpiece. The locator is then horizontally retracted from its locating position while the portable probe is vertically lowered to engage the workpiece with the opening thereof being positioned over the selected portion of the workpiece to be tested.

10 Claims, 13 Drawing Figures

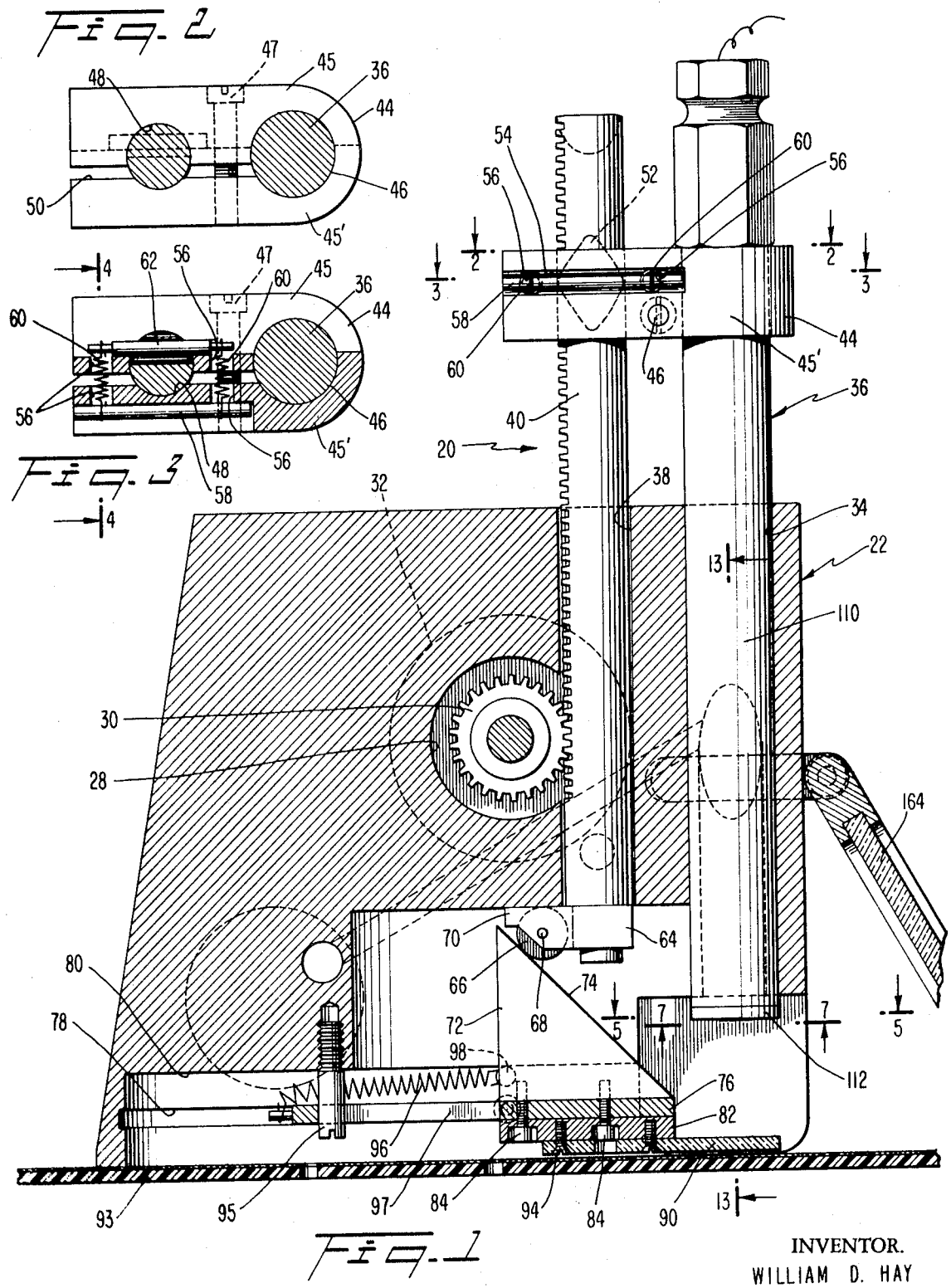

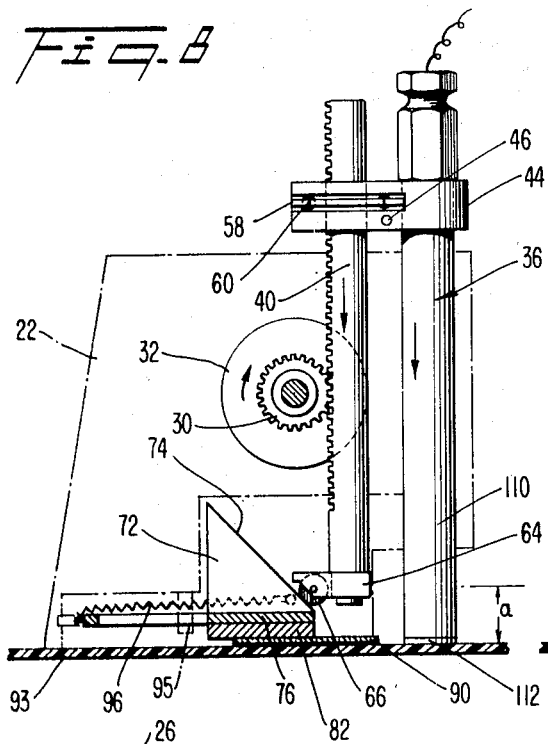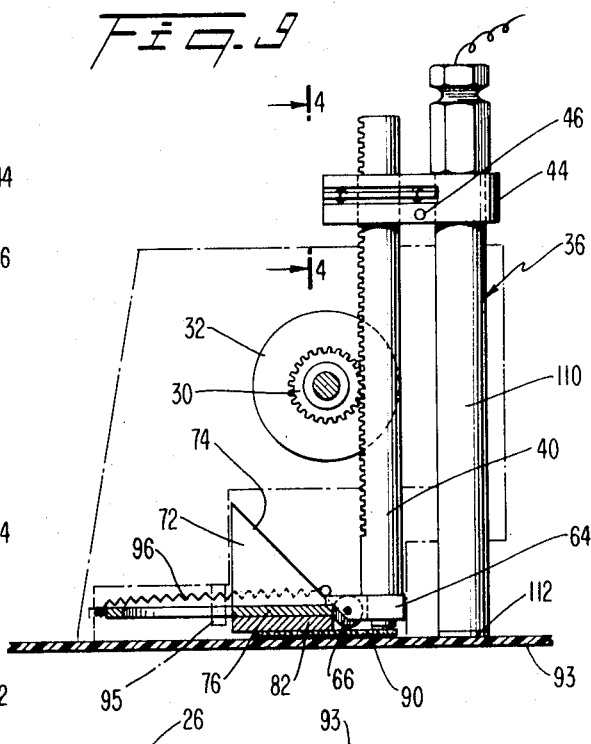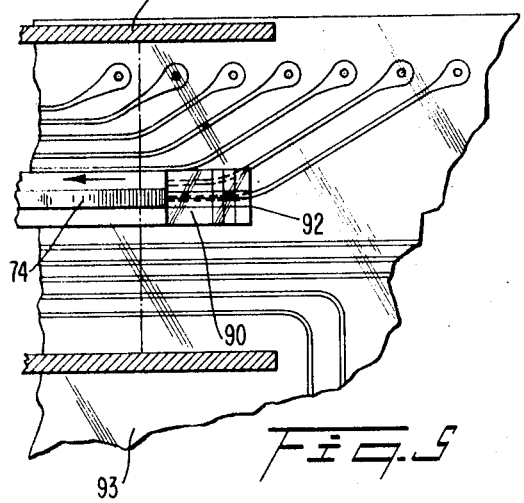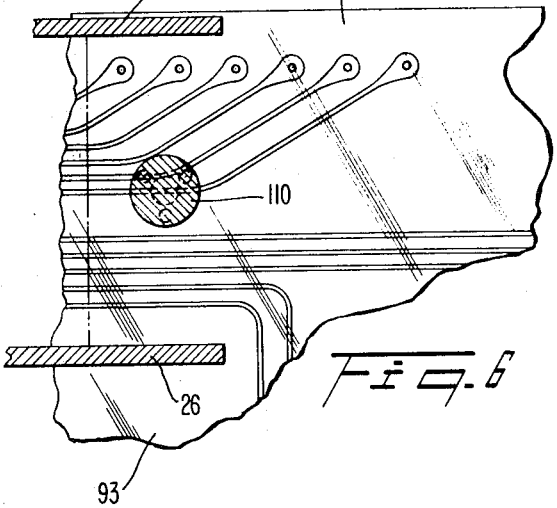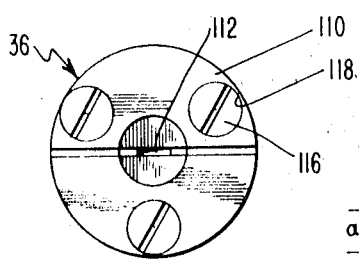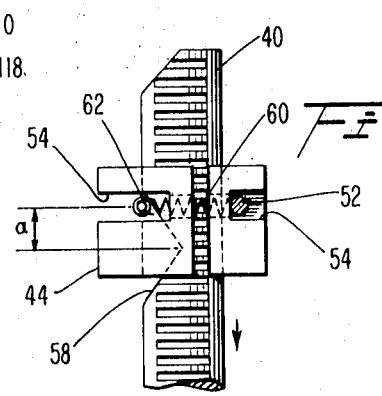
INVENTOR.
WILLIAM D. HAY
ATTORNEY

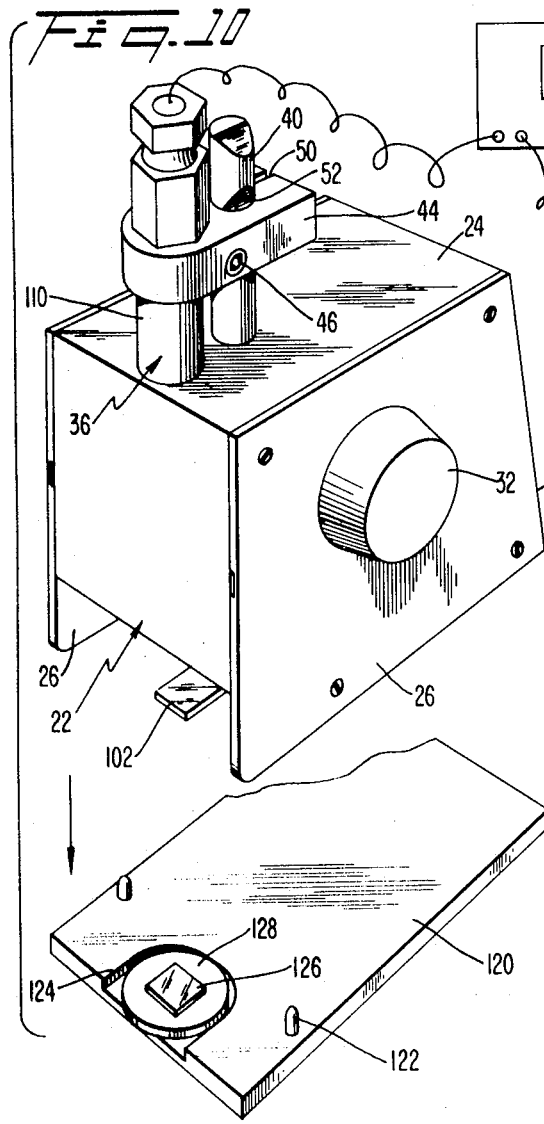
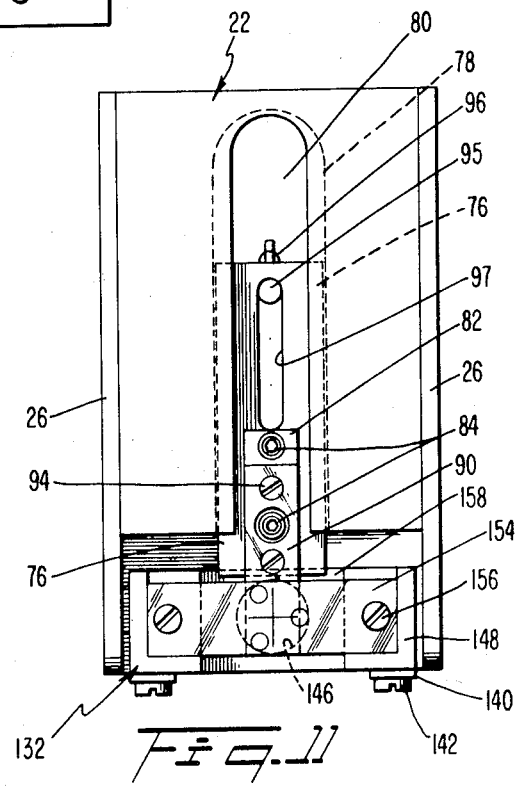

RADIATION BACKSCATTER MEASURING INSTRUMENT

This invention relates generally to instruments employing beta-radiation backscatter techniques for measuring the thicknesses of thin layers or coatings of one substance on a base material or substrate having a significantly different atomic number.

In instruments of the described type, radiation from a suitable beta-emitting isotope is directed against a surface of a workpiece or sample to be measured, and a detector, such as a Geiger tube, picks up the backscatter or beta-radiation back-scattered from the workpiece, and transmits corresponding signals to a suitable electronic system for interpretation and translation into readings on a meter. The intensity of the backscatter of the beta rays is proportional to the atomic number of the material at the surface of the workpiece against which the radiation is directed and, where the workpiece has a coating substance of an atomic number different than that of the base material or substrate, the intensity of the backscattered radiation is further proportional to the thickness of the coating.

Comparisons of the values obtained by the above procedure with the values from known thickness standards lead to quantitative measured results. Thus, through such comparative measurement techniques, the meter readings can be calibrated to indicate the thicknesses of various coating substances on various base materials. Beta-ray backscatter measuring instruments have particularly found application in the measurement of the thicknesses of thin precious metal deposits and other coatings on small or restricted areas of electronic components such as printed circuit boards and the like.

Only the coated area can be exposed to radiation if the thickness measurement thereof is to be accurate and reproducible since the backscatter of radiation from adjacent uncoated surfaces of the base material will result in an erroneous thickness measurement. Accurate and reproducible measurements of the thicknesses of such layers or coatings have been achieved for coatings which extend linearly for a substantial distance with the apparatus disclosed in U.S. Pat. No. 3,496,359 which issued on Feb. 17, 1970. Where, however, the coatings have an irregular configuration such as at contact fingers, small pads and other such areas which do not have a substantial linear component it has proven difficult to obtain an accurate and reproducible thickness measurement since the areas of the particular coatings to be measured cannot be precisely located.

This invention may be briefly described as an instrument employing beta radiation backscatter techniques for measuring the thicknesses of thin layers or coatings of one substance on a base material or substrate having a significantly different atomic number wherein a transparent plastic hair line alignor is horizontally positioned over and defines the locus of measurement or the precise area of the coating to be tested and is then horizontally retracted with a pencil probe unit being vertically lowered into engagement with the workpiece so that the opening through which beta rays pass from the probe unit is positioned over the area or locus located by the alignor.

Among the advantages of the present invention is the provision of an instrument which can measure the thicknesses of thin layers or coatings of one substance on a base material or substrate having a significantly different atomic number whether the layer or coating is regular or irregular, linear or curvilinear and whether the layer is tested at the terminus thereof or measured at a position along its length.

Accordingly the principle object of the present invention is the provision of an improved radiation backscatter measuring instrument that includes a guide or locator which can be positioned to define the precise area of the coating whose thickness is to be measured.

Another object of the present invention is the provision of a radiation backscatter measuring instrument in which the probe assembly is biased into engagement with the workpiece being tested and the magnitude of the biasing force is limited so that neither the workpiece nor the measuring instrument can be damaged during the testing operation.

Other objects and advantages of the present invention will become apparent from the following portion of the specification and from the accompanying drawings which illustrate, in accord with the mandate of the patent statutes, a presently preferred embodiment incorporating the principles of the invention.

Referring to the drawings:

FIG. 1 is a side elevational cross sectional view of the radiation backscatter measuring instrument of the present invention.

FIG. 2 is a view of the measuring instrument as constituted at the line 2—2 of FIG. 1.

FIG. 3 is a cross sectional view of the measuring instrument as constituted at the line 3—3 of FIG. 1.

FIG. 4 is a view of the measuring instrument as constituted at the line 4—4 of FIG. 9.

FIG. 5 is a view of the measuring instrument as constituted at the line 5—5 of FIG. 1.

FIG. 6 is a view similar to that of FIG. 5 with the portable probe assembly lowered into engagement with a circuit board workpiece.

FIG. 7 is a view of the measuring instrument as constituted at the line 7—7 of FIG. 1.

FIG. 8 is a view of the measuring instrument similar to FIG. 1 with the portable probe assembly lowered into engagement with the circuit board workpiece.

FIG. 9 is a view of the measuring instrument similar to FIG. 8 with the portable probe assembly biased into forceful engagement with the circuit board workpiece.

FIG. 10 is a perspective view of the measuring apparatus elevated out of engagement with a standardizing instrument.

FIG. 11 is a top view of the measuring instrument inverted and mounted on a stand to be utilized when the portable probe assembly opening and locator guide lines are aligned.

FIG. 12 is an elevational view of an alignment checker utilized in conjunction with the measuring instrument as illustrated in FIG. 11.

FIG. 13 is a view of the measuring instrument as constituted at the line 13—13 of FIG. 1.

Referring to the drawings, and initially to FIGS. 1 through 4, an instrument 20 employing beta radiation backscatter techniques for measuring the thicknesses of thin layers or coatings of one substance on a base material or substrate having a significantly different atomic number is illustrated. The measuring apparatus includes a housing 22 which has a central guide body 24 fixedly secured to a pair of opposing side walls 26 (FIG. 10). A horizontal bore 28 extends completely across the guide body and a pinion member 30 is rotationally supported by the opposing side walls and positioned therein. A pair of knobs 32 control the movement of the pinion member.

Two vertically extending bores are defined in the guide body. A first of these vertical bores 34 extends from the top to the bottom of the guide body and is selectively sized and shaped so as to slidingly receive a portable probe assembly 36. The second of these vertical bores 38 which also extends the entire vertical dimension of the guide body is selectively sized and shaped so as to slidingly receive a toothed rack member 40 which engages the pinion 30 and is controlled thereby.

The portable probe assembly 36 is mounted on the toothed rack of the rack and pinion assembly by means of a coupling 44. The coupling 44 has first 46 and second 48 cylindrical bores which extend from the top surface to the bottom surface thereof. A vertically extending slit 50 is established in the coupling and extends vertically from the top to the bottom surface thereof and horizontally from one side thereof, through one of the bores 48 to the other bore 46 thereby defining opposing coupling portions which are integral at the other end thereof. The coupling is made from a resilient material and the two coupling portions may be drawn together, with the solid end of the coupling functioning as a hinge, by a bolt 47 which extends through one portion of the coupling and is threadedly engaged with the other coupling portion. The first bore 46 is selectively sized so that when the two coupling portions are drawn together subsequent to the positioning of the probe assembly therewithin, the probe assembly will be compressively located within this first coupling bore 46 and will become integral therewith. The second coupling bore 48 is selectively sized so as to allow vertical displacement of the toothed rack therethrough when the coupling is integral with the probe assembly. The two coupling portions may be separate pieces which are hingedly joined.

The toothed rack has a horizontally extending V-shaped notch 52 and each coupling portion has a horizontal slot 54 which extends in a direction substantially parallel to the base of the V-shaped notch and a pair of bores 56 which extend perpendicularly thereto establishing a pair of continuous bores extending through the coupling from one slot to the other. A bar 58 is positioned in one slot and is attached by a pair of springs 60 which extend through the aligned bores 56 of the coupling portions to a rolling pin 62 which is positioned in the other slot. The slot in which the rolling pin is positioned has sufficient depth so that the rolling pin which is forcefully urged by the springs against the rack member can roll up the inclined surface of the V-shaped notch and along the outer surface of the rack member when the coupling is displaced vertically relative to the toothed rack. Such relative displacement may occur when the displacement of the portable probe assembly is blocked. When the portable probe assembly is free to move the compressive force exerted by the springs 60 is sufficient to maintain the rolling pin proximate the base of the V-shaped notch 52 and accordingly the portable probe assembly and the rack will then be displaced as a unit. The top of the rack has an inclined portion 63 to enable the integral portable probe and coupling members to be easily mounted on the toothed rack.

An axle supporting member 64 is secured to the bottom of the toothed rack and a wheel 66 is rotationally mounted to this axle 68. The axle supporting member has a stop 70 which projects horizontally therefrom towards the rear of the guide body.

The instrument includes a wedge shaped member 72 which has a camming surface 74 extending downwardly toward the front of the guide body. A pair of wings 76 extend outwardly from either side and rearwardly from the back of the wedge shaped member and are slidingly received in a pair of opposing grooves 78 defined in the guide body (FIGS. 11 and 13). These grooves extend horizontally towards either side of the guide body from a channel 80 which extends substantially from the front to the rear of the guide body. The grooves precisely mate with the wings 76 of the wedge shaped member 72 and accordingly restrict the motion thereof to a single direction from the front to the back of the guide body.

A base plate 82 is secured to the bottom of the wedge shaped member 72 by a plurality of screws 84 and a planar, locator 90 is secured in a horizontal disposition to the bottom surface of the base plate by a plurality of screws 94. A spring element 96 which extends between the rearward most point of the wings of the wedge shaped element and a pin 98 which is integral with the guide body urges the wedge shaped element forward toward the front of the guide body and accordingly results in the wheel 66 rolling up the camming surface thereby elevating the toothed rack and probe assembly until an upwardly extending post 95, in the form of a bolt, which is screwed into a threaded bore defined in the guide body and which projects downwardly through a slotted guide 97 in the wings of the wedge shaped element is stopped by abutting against one end thereof. The forwardmost or home position of the locator 90 is thereby determined.

The locator 90 (FIG. 5) is transparent and has a series of perpendicularly extending guide lines 92 on the bottom surface thereof and the height of the side walls 26 of the instrument is selectively chosen so that this surface will lie substantially within the plane defined by the bottom surfaces thereof. The entire instrument is placed on top of a circuit board workpiece 93 with the guide lines 92 of the locator locating a locus of measurement. The locator can be precisely positioned over any locus of measurement whether it is a portion of a pad, line (linear or curvelinear) or contact finger.

The portable probe assembly 36 is a conventional unit having an elongated casing 110 with a bottom facing plate or mask 112 having a rectangular opening 114 therein (FIGS. 1, 6 and 7). The casing includes a radiation source which is positioned in predetermined relation with the opening 114 and a radiation detector such as a Geiger-Muller tube for detecting radiation which is emitted from the source through the opening and backscattered therethrough from the workpiece area which is exposed to the radiation. The detected radiation is translated into utilizable intelligence by a readout meter 115 (FIG. 10). While the opening as illustrated is rectangular it could be square, circular or have any other common geometric configuration to suit the particular needs of any given situation.

When the locator is in the home position the center of the locus of measurement defined by the guide lines (FIG. 5) lies directly below the center of the opening of the vertically supported portable probe assembly. Accordingly as the locator is horizontally retracted by lowering the toothed rack, the portable probe will be lowered into engagement with the circuit board with the center of the opening thereof above the center of the specific locus of measurement located by the locator element (FIG. 6).

The bottom face plate or mask 112 (FIG. 7) of the portable probe is secured to the probe casing by three screws 116 which extend through apertures 118 defined therein. Sufficient tolerance is provided so that the mask can be adjusted a limited extent to vary the alignment of the opening.

As can be seen when reference is had to FIGS. 8 and 9 the portable probe 36 is lowered into engagement with the circuit board workpiece 93 prior to the lowering of the toothed rack to its lowermost position. When the downward displacement of the portable probe assembly is blocked by the circuit board workpiece the further rotation of the control knobs 32 results in the further lowering of the toothed rack 40 with the roller bar 62 rolling up the surface of the V-shaped notch 52 until the stop 70 of the axle supporting member 64 engages the top surface of the wings 76 of the wedge shaped member as illustrated in FIG. 9. The downward displacement of the rack is thereby limited so that it will not impact against the transparent locator. As can be seen the toothed rack is therefore displaced the selected distance a (FIG. 4) relative to the stationary portable probe assembly and when manually maintained at its lowermost position the stretched springs 60 exert a force which urges the portable probe assembly downwardly into compressive engagement with the circuit board workpiece. The force with which the portable probe assembly is urged into such engagement is independent of the operator and is solely dependent upon the strength of the spring element and the extent of stretching thereof when the toothed rack is displaced relative to the probe assembly the preselected distance a. Accordingly no harm to either the circuit board workpiece coatings or the portable probe assembly can result as a result of the operation of the instrument.

In order to properly standardize the testing apparatus a standardizing tool is provided which has a flat platform 120 with two locating pins 122 projecting upwardly therefrom and a depression 124 at one end thereof which has a sample supporting pin (not shown) projecting upwardly therefrom (FIG. 10). A sample of known thickness 126 is mounted on a cylindrical base 123 and is positioned on the sample supporting pin. The composite thickness of the sample 126 and the circular base 128 is a constant and is selectively chosen so that when the composite element is positioned on the pin with the top surface of the sample perfectly horizontal the top surface will lie in substantially the same place as the top surface of the platform. The measuring instrument is placed on the platform 120 with the locator 90 positioned over the sample. Since the bottom surface of the locator lies in the plane defined by the bottom surfaces of the side walls 26 or the top surface of the platform the composite member will be adjusted by engagement with the locator until the top surface thereof also lies substantially in the same plane. Standardization of the measuring instrument can then be effected.

To assure that the readings obtained will not vary due to the varying alignment of the opening of the portable probe assembly relative to the guide lines of the locator a method of aligning same may be practiced with the aligning apparatus of the present invention. This apparatus includes an alignment checker 132 (FIGS. 11 and 12).

The alignment checker (FIG. 12) has a pair of planar legs 140 secured by screws 142 to an elongated rectangular block 144. A bore 146 extends therethrough in a direction parallel to the legs and perpendicular to the top surface of the block. The bore is selectively sized so as to frictionally engage the portable probe assembly when it is inserted thereinto while allowing movement of the probe therethrough when sufficient force is applied to overcome these frictional forces. The top surface of the block includes a planar cutout 152 and a transparent plate 154 is placed therein and secured to the block by means of screws 156. The bottom surface of the transparent plate has a pair of perpendicularly extending cross-hairs marked thereon which extend precisely transversely and laterally across the plate. The portion of the alignment checker directly beneath the transparent plate is cut away thereby defining an access chamber 158.

To properly establish the alignment of the locator guide lines 92 and the mask opening 114 the measuring apparatus is inverted. With the locator member in its fully advanced position (FIG. 1) the alignment checker is positioned so that the locator member extends into the access chamber 158 and the alignment checker bore is coaxial with the elongated casing of the portable probe assembly. The locator member is maintained at its fully advanced position and the portable probe assembly is displaced relative to the stationary rack member towards its advanced position until the probe mask engages the locator member.

The fictional engagement of the portable probe casing and the alignment checker bore maintains the horizontal alignment of the transparent plate 154 of the alignment checker and when so engaged the planar legs 140 thereof contact the front face of the guide body 24 preventing the rotation of the alignment checker about the probe casing thereby maintaining the lateral and transverse alignment of the alignment checker cross hairs.

As can be seen in FIG. 1 a limited degree of tolerance is provided for the heads of the base plate bolts 84. Accordingly these bolts can be loosened and the integral base plate 82 and locator 90 can be adjusted relative to the wedged shaped member 72 until the guide lines thereof are precisely aligned with the alignment checker transparent plate cross-hairs. Tightening of those bolts will then maintain the desired alignment.

The control knobs 32 are then rotated whereby the locator member is retracted and the portable probe is then further advanced until the mask thereof engages the bottom face of the transparent plate 154 of the alignment checker.

The transparent plate includes three apertures 160 (FIG. 11) which are selectively located to lie above the bottom facing plate screws 116 of the probe assembly. The bottom facing plate screws can thereby be loosened and the plate can be manipulated within the block access chamber 158 until the opening 114 thereof is precisely aligned with the cross-hairs of the alignment checker and accordingly with the guide lines of the locator. Tightening these screws will then maintain the desired alignment thereof.

As an aid to the accurate positioning of the locator member over the desired locus of measurement, a pair of lights 162 are provided (FIG. 13) for increasing the visibility of the circuit board workpiece and a magnifying lens 164 is suitably secured to the guide body (FIG. 1) to provide an enlarged view of the coating portion being measured.

Having thus described my invention, what I claim is:

1. A radiation backscatter measuring instrument for use with a probe assembly having a vertically disposed elongated casing with an opening at the bottom thereof and containing a radiation source positioned in predetermined relation therewith and a radiation detector for detecting radiation backscattered from a horizontally supported workpiece exposed to radiation from the source through the casing opening comprising means for maintaining the vertically disposed elongated casing of the probe assembly in a retracted position spaced from the workpiece, locator means including a transparent, horizontally disposed member having guide lines thereon for precisely locating a locus of measurement on the workpiece, means for maintaining said locator means with said transparent member in an advanced position proximate the workpiece and vertically below the opening in the elongated probe assembly casing, means for horizontally displacing said locator means member from the advanced position thereof to a retracted position, and means for displacing the probe assembly casing downwardly from the retracted position thereof to an advanced position wherein the probe assembly casing engages the workpiece and the casing opening is situated above the locus of measurement located by said locator means.

2. A radiation backscatter measuring instrument according to claim 1, wherein said probe assembly casing displacing means further comprises means for biasing the probe assembly casing against the workpiece and means for limiting the magnitude of the force exerted by said biasing means when the probe assembly casing is in the advanced position.

3. A radiation backscatter measuring instrument according to claim 2, wherein said probe assembly casing displacing means includes rack and pinion means and means for integrally coupling said rack means to the elongated casing of the probe assembly during the displacement of the probe assembly casing from the retracted to the advanced position thereof.

4. A radiation backscatter measuring instrument according to claim 3, wherein said coupling means further comprises means for allowing the displacement of said rack means from a first position wherein the probe assembly casing is in the advanced position engaging the workpiece, downwardly a substantial distance to a second position, said allowing means including said means for biasing the probe assembly against the workpiece being tested.

5. A radiation backscatter measuring instrument according to claim 4 further comprising body means adapted to be positioned over the workpiece including first vertically extending bore means selectively sized for slidably receiving the vertically disposed elongated casing of the portable probe assembly and second vertically extending bore means for slidably receiving said rack means.

6. A radiation backscatter measuring instrument according to claim 5 wherein said rack means comprises said means for displacing said locator means.

7. A radiation backscatter measuring instrument according to claim 6 wherein said coupling means includes first and second portions resiliently joined at one end thereof, means for drawing one of said portions towards said other one of said portions, and first and second bore means vertically extending from the top surface to the bottom surface thereof and each being defined in said first and second portions, said bores being selectively sized so that when said two portions are so drawn together, the portable probe assembly can be compressively secured within one of said bores and said rack means can be slidably received within said other bore.

8. A radiation backscatter measuring instrument according to claim 7 wherein said rack means has a V-shaped notch defined therein with the base thereof extending horizontally thereacross, and said coupling means further comprises first and second opposing slot means extending substantially parallel to the base of said notch, one of said slot means communicating with the other one of said bore means, first and second pin means positioned within said slots, spring means connecting said first and second pin means for forcefully pulling said first pin means towards said second pin means, said one of said slots being selectively sized so as to allow one of said pin means to follow the inclined surface of said notch and the outer surface of said rack means as said rack means is displaced relative to the probe assembly.

9. A radiation backscatter measuring instrument according to claim 8, wherein said locator means further includes a horizontally displaceable cam means having a camming surface defining an angle with the axis of said rack means and said rack means further includes follower means for engaging said camming surface whereby the vertical lowering of said rack means towards the workpiece will horizontally displace said locator member away from the locus of measurement of the workpiece.

10. A radiation backscatter measuring instrument according to claim 5 further comprising alignment checker means including block means, transparent plate means including perpendicularly extending crossrhairs thereon access chamber means intermediate said plate means and said block means, bore means extending substantially perpendicular to said plate means and communicating with said access chamber means and selectively sized to frictionally engage the probe casing, and leg means extending in a direction parallel to the axis of said bore means and selectively located so that when the radiation backscatter measuring instrument is inverted and the alignment checker means is displaced so that the probe casing is inserted into the bore of said alignment checker means, said leg means will engage said body means for preventing the rotation of said alignment checker means about the probe casing.

* * * * *